US008634614B2

(12) United States Patent
Madsen

(10) Patent No.: US 8,634,614 B2
(45) Date of Patent: Jan. 21, 2014

(54) SYSTEM AND METHOD FOR VOLUMETRIC ANALYSIS OF MEDICAL IMAGES

(75) Inventor: Jamila Ahdidan Madsen, Aarhus N (DK)

(73) Assignee: Brainreader ApS, Aarhus C (DK)

( * ) Notice: Subject to any disclaimer, the term of this patent is extended or adjusted under 35 U.S.C. 154(b) by 359 days.

(21) Appl. No.: 12/995,770

(22) PCT Filed: Jun. 2, 2009

(86) PCT No.: PCT/DK2009/000127
§ 371 (c)(1),
(2), (4) Date: Mar. 18, 2011

(87) PCT Pub. No.: WO2009/146703
PCT Pub. Date: Dec. 10, 2009

(65) Prior Publication Data
US 2011/0160546 A1    Jun. 30, 2011

(30) Foreign Application Priority Data
Jun. 2, 2008  (DK) .................. 2008 00756

(51) Int. Cl.
*G06K 9/00* (2006.01)
(52) U.S. Cl.
USPC ....................................... 382/128
(58) Field of Classification Search
USPC ........... 382/128, 131; 128/922; 600/410, 411, 600/416, 425, 443, 449, 587; 378/4, 21, 37, 378/87, 88, 165
See application file for complete search history.

(56) References Cited

U.S. PATENT DOCUMENTS

| 6,009,212 A | 12/1999 | Miller et al. |
| 6,317,617 B1 * | 11/2001 | Gilhuijs et al. ............... 600/408 |

(Continued)

FOREIGN PATENT DOCUMENTS

| WO | WO 99/84983 | 12/1999 |
| WO | WO 02/39895 | 5/2002 |

(Continued)

OTHER PUBLICATIONS

Fox et al ("Brain Atrophy Progression Measured from Registered Serial MRI: Validation and Application to Alzheimer's Disease", the Dementia Research Group, National Hospital for NeuroloB and Neurosurgely, 8-1 1 Queen Square, London WCIN 3BG, United KIngdom. Heceived Nov. 27, 1996).*

(Continued)

Primary Examiner — Shervin Nakhjavan
(74) Attorney, Agent, or Firm — Gifford, Krass, Sprinkle, Anderson & Citkowski, P.C.; Weston R. Gould

(57) ABSTRACT

The invention relates to a system and a method for analysis and evaluation of at least one anatomical structure in a medical image, said medical image representing at least a part of a patient or person, said system comprising image analyzing means for calculating the volume and/or providing the shape of the at least one anatomical structure, and statistical analyzing means for providing a confidence interval of the volume and/or the shape of the analyzed anatomical structure(s) based on individual data of the patient or person, thereby quantifying the normality of said anatomical structure(s). By the present system and method a detailed and trustworthy confidence interval can be provided in connection with analysis and evaluation of a medical image of a patient, thereby illustrating the expected normality of the patient. The invention can be applied to images acquired from magnetic resonance imaging (MRI). One example of use is for diagnosing diseases and/or initial stages of diseases.

10 Claims, 4 Drawing Sheets

(56) References Cited

U.S. PATENT DOCUMENTS

Figure 1:
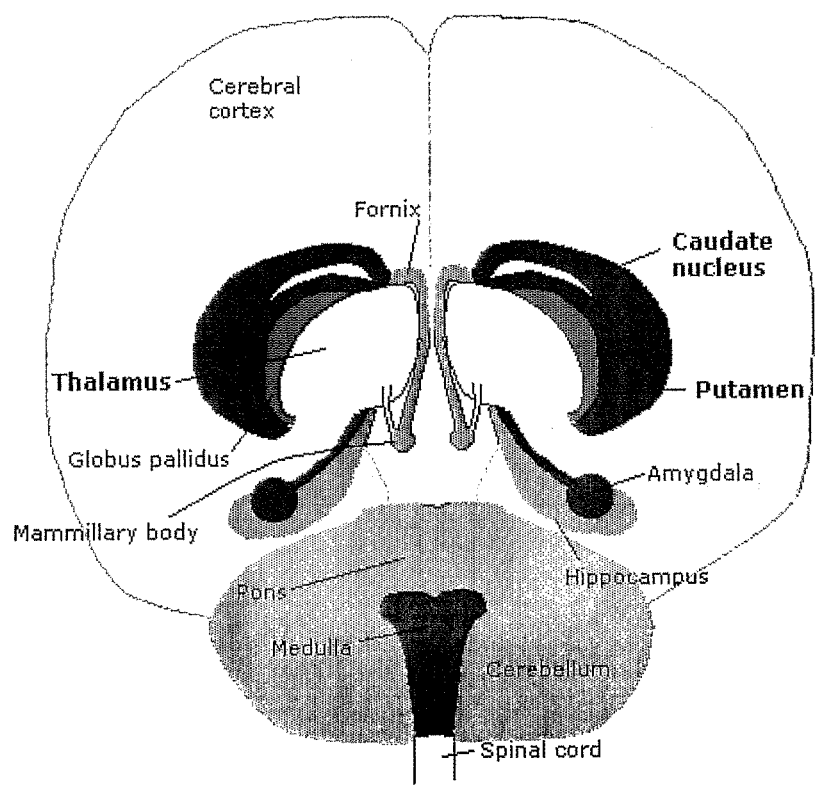

| | | | |
|---|---|---|---|
| 6,430,430 B1* | 8/2002 | Gosche | 600/410 |
| 6,584,216 B1 | 6/2003 | Nyul et al. | |
| 7,646,904 B2* | 1/2010 | Summers et al. | 382/128 |
| 2005/0244036 A1* | 11/2005 | Rusinek et al. | 382/120 |
| 2006/0104494 A1 | 5/2006 | Collins et al. | |
| 2007/0019849 A1* | 1/2007 | Kaufman et al. | 382/128 |

FOREIGN PATENT DOCUMENTS

| | | |
|---|---|---|
| WO | WO03/061458 | 7/2003 |
| WO | WO 2004/073489 | 9/2004 |

OTHER PUBLICATIONS

Brans et al ("Heritability of Changes in Brain Volume Over Time in Twin Pairs Discordant for Schizophrenia", Arch Gen Psychiatry/vol. 65 (No. 11), Nov. 2008).*

Carmichael et al., 2004, "Atlas-based hippocampus segmentation in Alzheimer's Disease and mild cognitive impairment", Robotics Institute, Carnegie Mellon University, Pittsburgh, PA, pp. 1-39.

D. L. Collins et al., 1995, "Automatic 3D model-based neuroanatomical segmentation", Human Brain Mapping, vol. 3, No. 3, pp. 190-208.

D. L. Collins et al., 1997, "Animal: validation and applications of non-linear registration-based segmentation", International Journal and Pattern Recognition and Artificial Intelligence, vol. 11, p. 1271-1294.

Getty et al., 1997, "Prostate cancer: Relative effects of demographic, clinical, histologic, and MR imaging variables on the accuracy of staging", Radiology, 204, pp. 471-479.

Kumra et al., 2000, "Childhood-onset psychotic disorders: magnetic resonance imaging of volumetric differences in brain structure", Am J Psychiatry, 157, 9, pp. 1467-1474.

Preussner et al., 2000, "Volumetry of hippocampus and amygdala with high-resolution mri and three-dimensional analysis software: minimizing the discrepancies between laboratories", Cereb Cortex, vol. 10, No. 4, pp. 433-442.

Stanchev et al., 2002, "Medimage—a multimedia database management system for Alzheimer's disease patients", Recent Advances in Visual Information Systems, 5th Int. Conference Visual 2002. Proceedings, vol. 2314/2002, pp. 187-193.

Thompson et al., 2000, "Disease-specific brain atalases", John C. Mazzlotta and Arthur W Toga: "Brain Mapping III: The Disorders", Academic Press, pp. 1-41.

Toga et al., 1999, "Multimodal brain atlases" in "Advances in Biomedical Image Databases", Kluwer Academic Press, Laboratory of Neuro Imaging, Dept. of Neurology, Division of Brain Mapping, UCLA School of Medicine, LA, CA.

* cited by examiner

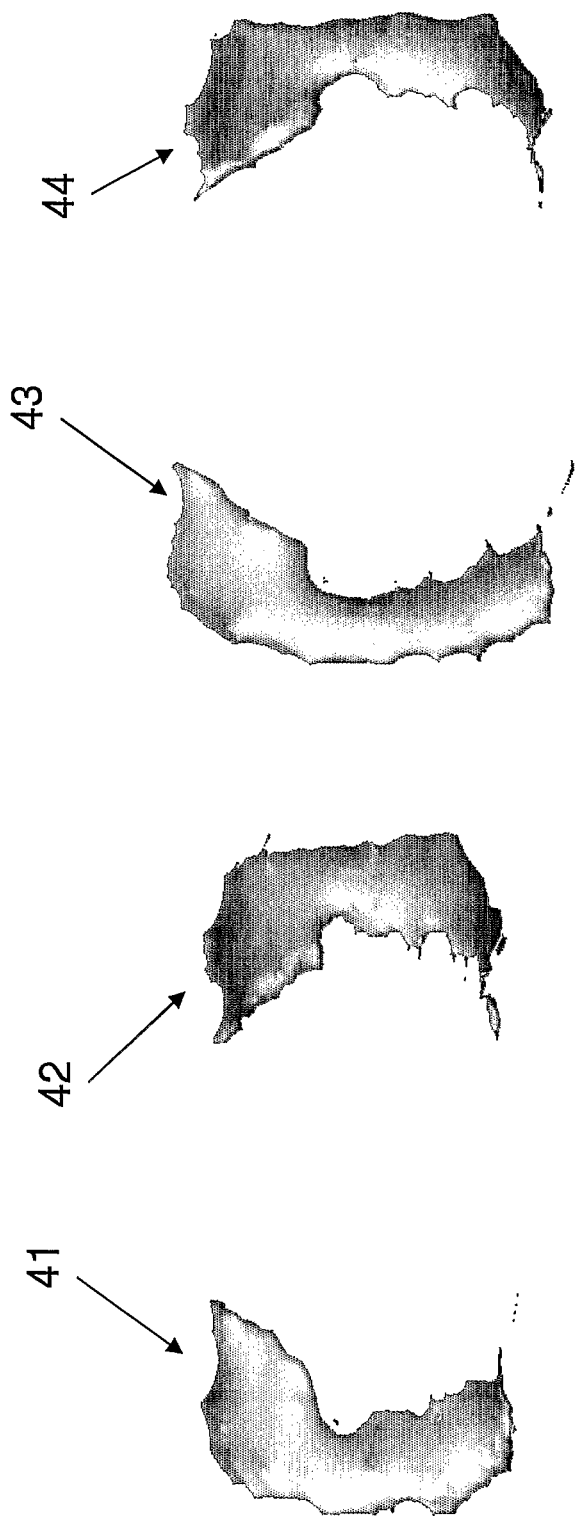

SYSTEM AND METHOD FOR VOLUMETRIC ANALYSIS OF MEDICAL IMAGES

CROSS-REFERENCE TO RELATED APPLICATIONS

This application is the U.S. national phase of PCT/DK 09/000127 filed Jun. 2, 2009 which claims priority of Danish Patent Application No. PA 2008 00756 filed Jun. 2, 2008.

The invention relates to a system and a method for analysis of medical images, such as magnetic resonance images, for automatic characterisation of the volume and/or shape of at least one anatomical structure, whereby diseases, or initial stages of diseases, can be diagnosed. Moreover, the invention relates to a computer-readable medium for implementing such a system on a computer network.

A plurality of medical imaging techniques exists that enables creation of 2D and/or 3D images of the human (or animal) body for clinical purposes. Techniques such as X-rays (used for instance in mammography and computed tomography (CT)), ultrasound, positron emission tomography (PET), and magnetic resonance imaging (MRI). CT provides good spatial resolution, which is necessary to be able to distinguish two structures an arbitrarily small distance from each other, i.e. to determine whether the structures are separate. MRI provides a resolution comparable with CT but with far better contrast resolution, i.e. the ability to distinguish the differences between two arbitrarily similar but not identical tissues. This ability makes MRI superior in connection with medical images, e.g. medical images of the brain.

A typical MRI examination of e.g. a patient consists of 5-20 sequences, each of which is chosen to provide a particular type of information about the patient's tissues. This information is then manually synthesised by the interpreting expert, e.g. a physician or a radiologist. In case of MRI data of the brain it must be a neuro-anatomical expert or someone trained in recognizing neuro-anatomical structures. The manual identification and analysis of the relevant anatomical regions is then provided by comparing the patient's data with an anatomical atlas, i.e. a reference image and/or a model image which has been identified in advance. In the reference image, particular anatomical regions may have been pointed out and labelled and contours may indicate the borders of the different anatomical regions, thereby providing an atlas for the radiologist.

Automatic analysis of MRI data has previously been presented (D. L. Collins et al.: "Automatic 3D model-based neuroanatomical segmentation", Human Brain Mapping, vol. 3, no. 3, pp. 190-208, 1995 and D. L. Collins et al.: "Animal: validation and applications of non-linear registration-based segmentation", International Journal and Pattern Recognition and Artificial Intelligence, vol. 11, p. 1271-1294, 1997). A non-linear registration technique is described wherein comparison of image raster data provides a spatial transformation between a source image and a target image. A major advantage of the non-linear transformation is that the calculations involved in comparing the images can be independent of previous analysis, identification or manipulation of the images. In particular the comparison is independent of segmentation of any of the involved images. Thus, once a spatial transformation between the two images is provided, specific information from one of the images, e.g. structure labelling and atlas specific information, can be transferred to the other image by applying the calculated spatial transformation. Thereby an atlas independent mathematical transformation is provided between the two images by means of the non-linear registration technique.

The medical images, also termed clinical images, provided by different medical imaging techniques, can provide a visualisation of the inside of the human body, whereby it is possible to for example detect bone fractures, aneurysms or other internal lesions. Medical imaging also provides the possibility of detecting diseases in advance of normal physical indications, characteristics or symptoms, e.g. screening for breast cancer with mammography. Mental illness is often caused by damages and/or abnormalities in the brain, and medical images of the brain can thereby help diagnosing mental diseases. Likewise, damages and/or abnormalities in the brain can be an indication of a mental illness or initial stages of same. For many diseases an early diagnosis dramatically improves the chance of recovery. Medical imaging is therefore an important tool in screening for, detecting, predicting and diagnosing diseases and initial stages of diseases.

A central problem in medical imaging is the interpretation of the data, especially how to define "normal" and "abnormal" to provide a diagnosis. Determining whether a bone is fractured or not is quite straightforward, diagnosing a tumour in an organ may be the challenge of detecting a foreign object, but distinguishing between a "normal" and an "abnormal" hippocampus is more complicated, because how to define "normal" and "abnormal"?

Analysis of medical images and/or providing criteria for normality and abnormality for detection and/or diagnosis of diseases, such as various types of mental illnesses, are known in the art.

WO 99/64983 describes a method and apparatus for classifying population states based on shape characterisation. Images are transformed to generate a map of the image enabling a comparison with the average shape characterising population groups and thereby classifying images based on probability matching. The method is applied to clinical imaging techniques, thereby providing a method for classifying clinical structural anomalies.

WO 02/39895 relates to a method for psychiatric profiling of a patient. By analysing brain scan images of the patient with brain scan images from a database combined with anatomical measures from the patient, early detection and prediction of psychiatric illnesses can be provided.

WO 2004/073489 describes a system and method for automatically measuring anatomical structures in medical imaging. By comparing the measured anatomical structures with average structures the measured structures can be classified according to a normal (Gaussian) distribution and a clinical diagnosis based on the result of the comparison can possibly be provided.

US 2006/0104494 A1 relates to a method of classifying imaging data from a test subject. Imaging data for a plurality of training subjects is collected, a statistical model is applied to the data from the training subjects and data from the test subject can thereby be classified. Diagnosis of various neurological diseases can thereby be provided.

A problem with the known methods is how to precisely apply a normality criterion on the interesting features of a medical image of a patient.

SUMMARY OF THE INVENTION

An object of the invention is to provide weighted atlases in relation to medical images of the human anatomy, i.e. to expand the notion of "normality".

A further object of the invention is to be able to quantify the normality of an anatomical structure by means of analysing and evaluating medical images.

This is achieved by a system for analysis and evaluation of at least one anatomical structure in a medical image, said medical image representing at least a part of a patient or person, said system comprising:

image analysing means for calculating the volume and/or providing the shape of the at least one anatomical structure, and statistical analysing means for providing a confidence interval of the volume and/or the shape of the analysed anatomical structure(s) based on individual data of the patient or person, thereby quantifying the normality of said anatomical structure(s).

By the system and method according to the invention a detailed and trustworthy confidence interval can be provided in connection with analysis and evaluation of a medical image of a patient. For example, comparing the size and shape of the neuro-anatomical structure hippocampus, provided from MRI data of the brain of an eleven-year old left handed Asian female patient, to the average human hippocampus does not make sense. It will not be possible to conclude on any potential diagnosis of the patient. By the system according to the invention a confidence interval is provided to illustrate the expected normality of the patient. Using the example above a confidence interval would be provided to illustrate the expected average size and shape of a hippocampus from an eleven-year old left handed Asian girl.

The object of the invention is furthermore achieved by a method for analysis and evaluation of at least one anatomical structure in a medical image, said medical image representing at least a part of a patient or person, said method comprising the steps of:

analysing the image for calculating the volume and/or providing the shape of the at least one anatomical structure, and providing a confidence interval of the volume and/or the shape of the analysed anatomical structure(s) by means of statistical analysis, based on individual data of the patient or person, thereby quantifying the normality of said anatomical structure(s).

In a preferred embodiment of the invention, individual data of the patient(s) or person(s) involved comprises information about gender (sex), age, various physical characteristics, diseases, cholesterol level, blood type, genotype, ethnicity, habits, handedness, cognitive measures, educational level and/or the like.

Physical characteristics of the patient can for example be height, weight, size of various parts/limbs of the patient, e.g. the size of the head and/or the brain (i.e. weight, volume, diameter, cross sectional area) and the like.

Information on habits can be information on smoking habits, physical activity, eating habits and/or the like.

Information on diseases can be the patients medical record comprising previous courses of diseases, e.g. information on diseases like diabetes, hereditary diseases (e.g. in the patients family), and the like.

Many of these data types can also be termed demographic variables and/or population specific values. The listed data may often relate to physical characteristics of the patients or persons and thereby provide influence of the size and/or shape of various anatomical regions and structures. The focus of this invention is to provide a trustworthy correction for the unknown physical characteristics expected from each patient based on individual data for said patient.

The individual data for the patient(s) or person(s) used in the system or by the method according to the invention can be any combination of the previously mentioned data types. In some cases it is only necessary to include a few individual data types in the statistical model, thereby simplifying the statistical analysis.

In one embodiment of the invention, individual data of the patient(s) or person(s) involved comprises information about gender, age, height, and weight.

In another embodiment of the invention, individual data of the patient(s) or person(s) involved comprises information about physical dimensions of the head and the brain, i.e. volume, weight, cross sectional area and diameter of the head and the brain.

In another embodiment of the invention, individual data of the patient(s) or person(s) involved comprises information about gender, age, height, weight and physical dimensions of the head and the brain, i.e. volume, weight, cross sectional area and diameter of the head and the brain.

In another embodiment of the invention, individual data of the patient(s) or person(s) involved comprises information about genotype and ethnicity.

In another embodiment of the invention, individual data of the patient(s) or person(s) involved comprises information about cognitive measures, habits and handedness.

In another embodiment of the invention, individual data of the patient(s) or person(s) involved comprises information about previous and present diseases, smoking habits, eating habits and physical activity habits.

Furthermore, individual data can be gender, age, height, weight, genotype and ethnicity.

Individual data can be gender, age, height, weight and disease history.

Individual data can be gender, age, blood type, cholesterol level.

Individual data can be gender, age, handedness and ethnicity.

In a preferred embodiment, the system according to the invention comprises means for segmenting the medical image.

In a preferred embodiment of the invention at least one reference image is provided. The reference image preferably comprises a segmented reference model. In a further embodiment of the invention the segmentation of the medical image is provided by means of a registration procedure, preferably a non-linear registration procedure. The reference image is preferably segmented prior to being used in the system according to the invention. In a segmented image the structures in the image have been "gathered" into anatomically meaningful regions. In most cases a segmented image is labelled down to each voxel (each pixel for a 2D image), i.e. each voxel is identified as being part of at least one structure in the image. The registration of the medical image is then provided by calculating a mapping between the medical image and the reference image. Preferably each voxel in the medical image is being brought in registration with a voxel in the reference image. The calculated spatial transformation function mapping the medical image to the reference image can be inverted. The segmentation information for the reference image can thereby be mapped to the medical image, whereby segmentation of the medical image can be provided.

Segmentation of an image can be performed in various ways and a plurality of segmentations can be accorded to one image. In one embodiment of the invention a reference image comprises more than one segmented reference model. When a medical image has been brought into registration with a reference image via a continuous spatial transformation function, each of the segmentations of the reference image can be mapped to the medical image. I.e. each of the segmented reference models for a reference image can immediately be used in connection with the medical image.

One embodiment of the invention comprises means for providing a confidence interval of the volume and/or the shape of at least one anatomical structure in the reference image based on individual data of the patient or person. Instead of comparing the anatomical structures of interest in the medical image to average anatomical structures in one or more reference images, the reference model can be manipulated to provide the normality of the anatomical structures of interest based on individual data of the patient. I.e. the reference image reflects the expected size and/or shape of the anatomical structure of interest of the patient.

As previously mentioned, atlas independent segmentation methods are known in the art. On the other hand, more precise and faster segmentation can be provided by using a labelled atlas in the segmentation procedure. In the system and the method according to the invention the reference model is preferably segmented in advance, thereby providing an atlas for the medical image that is analysed. Having a segmented reference model of the medical image the subsequent segmentation procedure of the medical image can be substantially fast. Once the medical image is segmented, it can be brought in accordance with the reference image. The segmentation procedure is wherein the anatomical structure of interest is identified in the medical image.

In another embodiment of the invention a labelled atlas for segmenting the medical image is provided by changing the anatomical structure of interest in the reference image, by manipulating the reference image to reflect the expected normality of the patient based on individual data of said patient. Thereby a more lifelike reference image is provided before actuating the mapping procedure, and a more precise and/or faster segmentation process can be provided. For example, the anatomical structure of interest is the hippocampus from an MR image of the brain from 45-year old male diabetic smoker with a big head. The reference image would be an MR brain image of a normal brain, i.e. an averaged image from a plurality of brains. A better "reference" could be provided if the reference image reflected the expected size of the hippocampus from a 45-year old male diabetic smoker with a big head.

A preferred embodiment of the invention comprises means for normalising the medical image. The normalising is preferably provided prior to analysing the image. The images are corrected for non-uniformity of the intensities through the image.

The confidence interval of the analysed volume and/shape can be provided in different ways. In term of analysing a volume, the confidence interval can simply be provided by means of a numerical value. When analysing the variation of the shape of a structure, a numerical value may not provide sufficient information, especially in terms of 3D structures. In one embodiment of the invention at least one graphical representation illustrates of the variation of the shape and/or volume. The confidence interval can also be illustrated by a graphical representation. The graphical representation(s) can be provided in the medical image and/or in the reference image.

In one embodiment of the invention, the structure of interest is divided into a plurality of subdivisions, i.e. the structure is divided into a plurality of sub-volumes. The normality of each of the sub-volumes can subsequently be quantified and/or illustrated graphically, thereby providing a more detailed analysis of each structure of interest.

Once the medical image has been segmented, the structures of interest have been identified and image analysis tools can subsequently provide the shape and/or the volume of said structures. When a volume of one or more structures of interest is provided, a user of the system according to the invention can be provided with information of the normality of said volume, based on a confidence interval provided by statistical analysis.

In one embodiment of the invention a shape of one or more structures of interest is provided. A user of the system can be provided with detailed spatial information of how the shape resembles an expected normal volume, by comparing the shape of the structure of interest in the medical image with the shape of the reference image, which has been manipulated to reflect a normal shape based on individual data of the patient. The difference between the images can also be illustrated by showing how the shape of the structure of interest from the medical image, should be deformed to resemble a normal image.

In a preferred embodiment of the invention statistical analysing means are comprised. Statistical analysis can be applied to the volume and/or shape of the structure of interest, e.g. for providing a confidence interval of the analysed structure, preferably based on individual data of the patient. Thereby the normality of the analysed structure can be provided. In case of analysing a volume, i.e. when dealing with numbers, a quantification of the normality of the structure can be provided.

During the course of a disease the different stages may result in variations of various anatomical structures. E.g. when a disease such as Alzheimers progresses, certain neuroanatomical regions can change in size and/or shape. In one embodiment of the invention a variation over time of the volume and/or the shape of at least one anatomical structure in at least two medical images acquired at different times can be analysed, evaluated and illustrated. The analysis is preferably combined with individual data of the patient. It is straightforward to compare different images and detect the changes of the same anatomical structure of the same patient over a period of time. But if the time period of the different acquired medical images is running over a substantial period of time, e.g. several years, the change in size and/or shape of the anatomical structure can be caused by a plurality of reasons. By comparing the analysis with individual data of the patient, the size and/shape of the anatomical structure can be corrected for the expected changes that happens in the period of time. The changes happens partly due to the course of time, i.e. the patient is getting older, but for instance changed habits and known diseases in that period may also influence the variation of the anatomical structure. Thereby a much more precise and trustworthy analysis and evaluation of the medical images can be provided.

In one embodiment of the invention the reference image is a previously acquired medical image of the patient or person. For example a previously acquired image of a patient can serve as the starting point in an analysis of the development of a disease.

In a preferred embodiment of the invention at least one database of medical images from a plurality of persons is comprised. The medical images in the database are preferably segmented. Information about individual data and/or diseases of the persons is preferably comprised in the same database. With the database information the statistical information and calculations necessary for the corrections of the reference image and the analysed anatomical structures can be provided.

In a preferred embodiment of the invention the medical images are provided by means of magnetic resonance imaging (MRI). In case of brain analysis MRI is the preferred medical imaging system, because MRI provides the best image contrast, which is essential when identifying the various neuro-anatomical structures of the brain. In the system and method according to the invention the MRI data are preferably T1-weighted. However, the invention is not limited to one image contrast system, and T2-weighted or other types of image contrast schemes used for acquiring the medical images can be provided.

In one embodiment of the invention the medical images are provided by means of computer tomography (CT), whereby the medical images are CT images.

In another embodiment of the invention the medical images are provided by means of ultrasound, whereby the medical images are ultrasound images.

With increasing precision in medical imaging of the human body, the focus of diagnosing various diseases, or initial stages of diseases, is also increasing. The human brain is divided into various, more or less distinct, anatomical structures and regions. Diagnosing or detecting a disease, such as a mental disease or illness, is often provided by analysing the size and shape of one or more of these anatomical structures in the brain. In a preferred embodiment of the invention segmentation of one or more of the following neuro-anatomical structures can be provided: hippocampus, amygdale, putamen, pons, thalamus, global pallidus, brainstem and cerebellum. However, the invention is not limited to analysis and segmentation of neuro-anatomical structures.

A further object of the invention is to provide a diagnosis of a patient by means of analysing medical images of said patient.

This is achieved by a preferred embodiment of the invention, wherein means for diagnosing diseases and/or initial stages of diseases are provided. The diagnosing is preferably based on the normality and/or a confidence interval provided on the analysed volume and/or shape of the anatomical structure. Diseases such as depression, Alzheimer, epilepsy, post traumatic stress disorder, anxiety and/or Parkinson can preferably be diagnosed by the system. The invention is not limited to diagnosing of the listed diseases.

Diagnosing of diseases and/or initial stages of diseases can be provided by feeding the system with information of the characteristics of the diseases. For example a certain change in size and/or shape of a neuro-anatomical structure like hippocampus might indicate the initial stages of Alzheimer's disease. Access to such information is preferably provided to the system and method according to the invention, e.g. by means of databases, and the segmentation and analysis of a patient's brain provided by the system can thereby provide a diagnosis. The analysis is furthermore combined with the information of individual data of the patient, whereby small deviations from normality in the anatomical structures of the patient can be detected. The result is that diseases can be detected and diagnosed sooner than what is hitherto known. That is the major advantage of the current invention.

In a preferred embodiment of the invention the system is hosted on and provided through at least one web server. Thereby a medical image can be analysed through a web-site. In a preferred embodiment of the invention a medical image acquired from a patient is uploaded to a web-site and subsequently automatically analysed. Individual data of the patient can also be provided through the web-site, e.g. by providing the social security number of the patient, which can provide information of a plurality of individual data of the patient. A result of the analysis, may be supplied with a diagnosis, can also be provided through the web-site. The segmented and analysed anatomical structures can be illustrated on the web-site, e.g. a 2D or a 3D-image showing the anatomical structures. Possibly also illustrating the expected (i.e. the normal) size and shape of the anatomical structure based on individual data of the patient.

The invention furthermore includes a computer program product having a computer readable medium, said computer program product comprising means for carrying out any of the listed methods.

DRAWINGS

Figure 2:
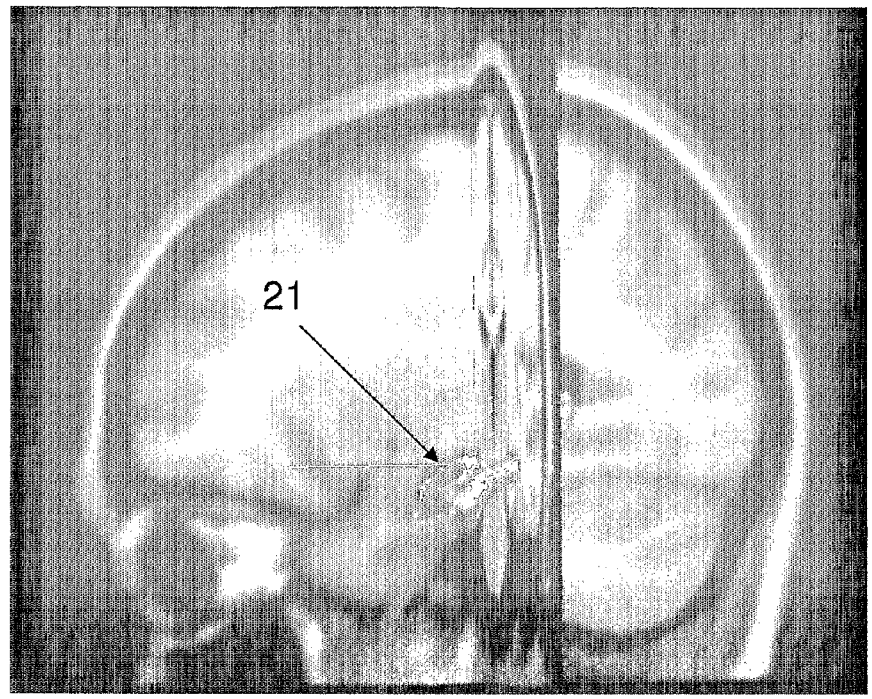
Figure 3:
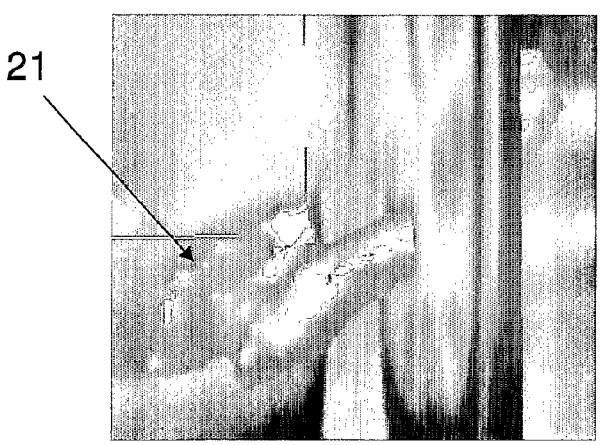
Figure 5A:
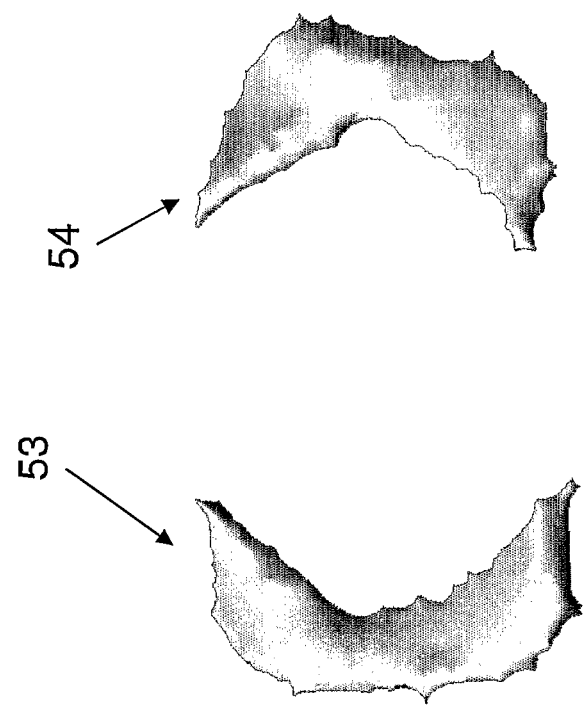
Figure 5B:
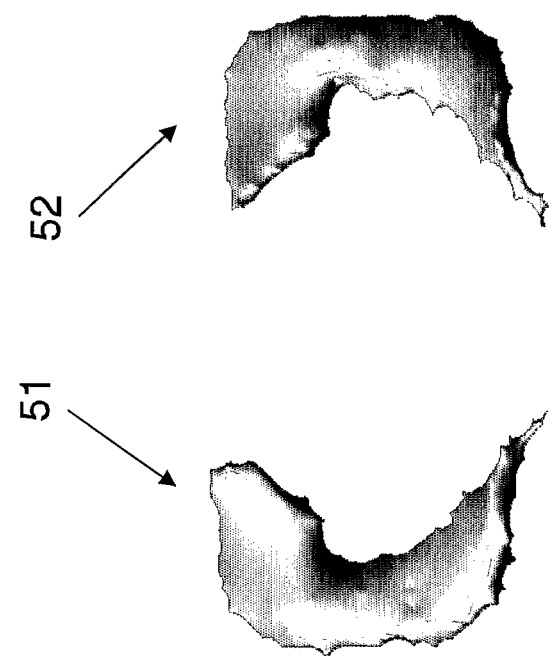

The invention will now be described in greater detail with reference to the figures, in which FIG. 1 is an illustration of the human brain and various neuro-anatomical structures, FIG. 2 shows a segmented hippocampus from a 3D MRI scan, FIG. 3 is a blow-up of the segmented hippocampus shown in FIG. 2, FIGS. 4A and 4B show examples of hippocampus from a patient suffering from depression, and FIGS. 5A and 5B show examples of hippocampi from different persons.

FIG. 1 shows a see-through front view illustration of the human brain, wherein various neuro-anatomical structures have been indicated. The listed neuro-anatomical structures are examples of anatomical structures that can be segmented and analysed by the system and method according to the invention. As seen in FIG. 1 neuro-anatomical structures such as caudate nucleus, putamen, thalamus, global pallidus, amygdala, hippocampus and fornix are located in both the right and left side of the human brain. The size and shape of the right and left versions of these structures are not necessarily equal.

An example of segmentation of the neuro-anatomical structure hippocampus 21 in a 3D medical image of the human brain is illustrated in FIGS. 2 and 3, where FIG. 3 is a blow-up of the segmented hippocampus 21 shown in FIG. 2. The illustrated example is provided from a T1-weighted MRI scan of a human brain.

FIGS. 4A and 4B show the change over five years of the hippocampus of a 21 year old male patient suffering from depression. The pictures have been obtained from MRI scans of the patient and subsequent segmentation and analysis according to the method described herein. FIG. 4B shows the first image of the patient with 43 being the left hippocampus and 44 being the right hippocampus. FIG. 4A shows the right 42 and left 41 hippocampi of the same patient acquired approx. five years after the image in FIG. 4B. The patient suffered from depression in these five years and it is clearly seen that the hippocampi in FIG. 4A are smaller than the hippocampi in FIG. 4B. Volumetric analysis shows that the hippocampi in FIG. 4A are each 3.2 mL (corresponding to 0.0032 l) whereas the hippocampi in FIG. 4B are each 5.0 mL (corresponding to 0.005 L). The shape of the shown hippocampi has changed, from the longer and slimmer hippocampi in FIG. 4B to the squeezed and chubby hippocampi in FIG. 4A. When analysing the shown hippocampi it is necessary to compensate for the changes of hippocampus expected in the five years between obtaining the images. The patient has become older and various habits and physical characteristics might have changed in the five years. The system and method according to the invention preferably compensates for these changes when analysing the medical images.

FIGS. 5A and 5B show hippocampi from two different healthy male persons of 45 years of age. The hippocampi in FIG. 5B are substantially bigger and longer (volume of 6.9 mL each, total brain volume of 1700 mL) than the hippocampi in FIG. 5A (volume of 4.0 mL each, total brain volume of 1400 mL). Some of these differences can be explained by the difference in total brain size, but the example in FIGS. 5A and 5B shows that the volume and shape of neuro-anatomical structures, such as hippocampus, vary considerably, even between apparently comparable persons. The system and method according to the invention can provide a normality criterion to each of the medical images in FIGS. 5A and 5B by feeding the applied statistical model with the known individual data of the involved persons.

DEFINITIONS AND DETAILED DESCRIPTION OF THE INVENTION

Voxel

A voxel is the three dimensional (3D) analogue to the two dimensional (2D) pixel.

Mental Diseases

By mental diseases are understood diseases, illnesses, syndromes or disorders relating to the brain, i.e. psychiatric illness, neurological diseases and the like.

Spatial Normalisation and Stereotaxic Space

In case of brain medical images from MRI, scans from multiple persons can vary due to differences in slice orientation and brain features (i.e. the brain size and shape varies across individuals). Therefore it is generally useful to normalise MRI scans to a standard template image. Spatial normalization procedures typically smooth brain images before attempting normalisation. Spatial normalisation is then the process of translating, rotating, scaling, and may be warping a brain to roughly match a standard template image. After normalisation, locations using stereotaxic coordinates can be provided. This format uses three numbers (X, Y and Z) to describe the distance from an origin, typically one of the sulci. The normalized images for any two persons will probably not have the same sulci in the same locations, because the distribution of sulci in the brain varies from person to person and also over time for the same person. As a consequence, stereotaxic coordinates are probabilistic.

Manual Segmentation

Segmentation is the regional parcellation of an image into anatomically meaningful contiguous groups of voxels. E.g. segmentation of MRI data from a brain scan is the division of the data into "interconnected" regions, whereby a subsequent classification identifies the specific neuro-anatomical regions (structures), such as hippocampus, amygdala, putamen, pons, thalamus, global pallidus, brainstem and cerebellum.

Manual anatomical segmentation is typically accomplished by comparing one or more reference figures, e.g. from an anatomical textbook, with the digital image to be segmented. A border enclosing a particular anatomical region can be defined and refined by studying the contrast variations in the image and possibly comparing to the contours of the reference figures.

In case of manual segmentation of brain image data, a brain atlas is used as a guide for identification of neuro-anatomical regions, provided the assumption that there is a topographical invariance among the different neuro-anatomical regions. Manual segmentation of a specific measured brain image is then provided by determining the spatial transformation required to map the reference brain atlas to the measured brain image. To determine the contours of a particular neuro-anatomical region in the measured brain image, features from the reference brain atlas is manually matched with corresponding features of the measured brain image. This manual matching is typically provided by a specialist, such as for example a neuro-anatomist, a physician or a radiologist.

Automatic Segmentation and Transformation

An automatic segmentation procedure involves digitally comparing at least two different images, wherein at least one of the images has been segmented, i.e. the different regions of this image have been identified and registered and it will thereby function as an atlas. Typically an acquired image is segmented by comparing to a reference image which has been segmented to provide an atlas.

In a preferred embodiment of the invention the automatic segmentation of an acquired medical image is provided by first comparing intensity based features of the reference image to the corresponding intensity based features of the acquired image. This process provides a spatial transformation that best maps the reference image to the acquired image. This spatial transformation is typically a non-linear transformation to provide an appropriate mapping. Raster data from the two images are preferably compared to calculate a transformation grid providing the best possible match between the two images. In a preferred embodiment of the invention, the calculated transformation grid maps the reference image to the acquired image. When using raster image data the images are compared on a per pixel level. Thus, in the case of 3D images, they are compared on a per voxel level to provide a spatial transformation function that best maps the reference image to the acquired image.

The spatial transformation function or mapping between two 3D images is often represented by a transformation grid. This transformation grid is typically a matrix of vectors describing how each voxel in the image is mapped. A three-dimensional vector for each voxel represents the movement of that particular voxel going from one image to the other image.

A major advantage of this approach is that the transformation is independent of an atlas of the reference image, i.e. the reference image does not need to be segmented before calculating the transformation to an acquired image. And once the transformation grid is provided, any atlas that segments the reference image can be mapped onto the acquired image using the same transformation grid. I.e. multiple atlases can exist for the reference image, where each atlas points out or emphasises certain features and/or anatomical regions in the reference image. And each of the atlases can be mapped onto the acquired image using the same transformation, whereby the features pointed out or emphasised in the reference image can be identified in the acquired image. However, faster and more precise segmentation is still provided by using an atlas reference image.

For 2D images, it has been shown that manual segmentation involving an experienced radiologist can be more precise and reproducible, but that often applies to the single radiologist or physician providing the segmentation. A different, maybe even also experienced, radiologist may reach different results when trying to segment the same images as the first radiologist. That has led to varying results when trying to establish standards, e.g. for volumes of specific neuro-anatomical regions, between different laboratories.

A manual segmentation procedure is provided by using 2D images, because even for an experienced radiologist it is difficult to compare 3D images. Manual segmentation is typically also limited by technology, because most digital pointing tools, such as a mouse or a trackball, are limited to movement in two dimensions. Use of 2D images is a source of error due to the risk of comparing 2D image slices acquired from different angles of the body or brain. Computerised automatic 3D image comparison and analysis on a per voxel level eliminates the source of error of comparing images acquired at different angles, and the human nature source of error from variability between a plurality of radiologists and their different ways of segmenting and interpreting medical images.

Individual Data

The size and/or shape of internal organs, bones and/or regions of the brain may vary from human to human. Statistical models can provide the distributions of the size and/or shape of specific anatomical regions as a function of various demographic variables. "Demographics" is a short term for population characteristics. Demographic data may comprise information about age, income, mobility, employment status and the like. In terms of the influence of the size and/or shape of various anatomical regions, individual data relating to physical characteristics of the patients are more interesting and relevant.

Magnetic Resonance Imaging

Magnetic resonance imaging (MRI) is primarily used in medical imaging to visualise the structure and function of the body. It provides detailed images of the body in any plane.

In clinical practice, MRI can be used to distinguish pathologic tissue (such as a brain tumour) from normal tissue. One advantage of an MRI scan is that it is harmless to the patient. It uses strong magnetic fields and non-ionising radiation in the radio frequency range.

MRI has much greater soft tissue contrast than computed tomography (CT) making it especially useful in neurological, musculoskeletal, cardiovascular, and oncological imaging. Unlike CT, it uses no ionising radiation, but uses a powerful magnetic field to align the magnetisation of hydrogen atoms in the body. Radio waves are used to systematically alter the alignment of this magnetisation, causing the hydrogen atoms to produce a rotating magnetic field detectable by the scanner. This signal can be manipulated by additional magnetic fields to build up enough information to reconstruct an image of the body.

When a patient is in the MRI scanner, the hydrogen nuclei (i.e., protons, found in abundance in the human body as water) align with the strong magnetic field. A radio wave at just the right frequency for the protons to absorb energy pushes some of the protons out of alignment. The protons then snap back to alignment, producing a detectable rotating magnetic field as they do so. Since protons in different areas of the body (eg, fat v. muscle) realign at different speeds, the different structures of the body can be revealed. Gradient fields in the three dimensions allow the scanner to work only with protons from one slice at a time, allowing the creation of a whole volume that can be looked at in three dimensions.

Human brain mapping data has been collected as part of the International Consortium of Brain Mapping, and atlases of the normal human brain can be provided through the website http://www.loni.ucla.edu/ICBM/.

Image Contrast

In order to understand MRI contrast, it is important to have some understanding of the time constants involved in relaxation processes that establish equilibrium following RF excitation. As the high-energy nuclei relax and realign they emit energy at rates which are recorded to provide information about the material they are in. The realignment of nuclear spins with the magnetic field is termed longitudinal relaxation and the time required for a certain percentage of the tissue's nuclei to realign is termed "Time 1" or T1, which is typically about 1 second at 1.5 tesla main field strength. T2-weighted imaging relies upon local dephasing of spins following the application of the transverse energy pulse; the transverse relaxation time is termed "Time 2" or T2, typically <100 ms for tissue at 1.5 tesla main field strength.

Image contrast is created by using a selection of image acquisition parameters that weights signal by T1, T2 or T2*, or no relaxation time ("proton-density images"). In the brain, T1-weighting causes the nerve connections of white matter to appear white, and the congregations of neurons of gray matter to appear gray, while cerebrospinal fluid appears dark. The contrast of "white matter," "gray matter" and "cerebrospinal fluid" is reversed using T2 or T2* imaging, whereas proton-weighted imaging provides little contrast in normal subjects. Additionally, functional information (CBF, CBV, blood oxygenation) can be encoded within T1, T2, or T2*.

EXAMPLE

Below is provided an example of the procedure for brain structure model-based segmentation and statistical characterisation in the form of a confidence interval based on a reference model.

1. A reference model is initially created, wherein the structures of interest are segmented and measured.
2. A formula is calculated using the demographic and/or individual data, such as sex (gender), age, height, weight, genotype, ethnicity, habits, handedness, cognitive measures and the like, of the persons included in the model, and returns a confidence interval of the volume of the structures of interest.
3. Finally, a patient's 3D image is provided as input to the system, with the patient's demographic and/or individual data, and the system returns a 3D image of the structure(s) of interest, the volume(s), and confidence interval.
4. The 3D image of the segmented structure can be coloured reflecting the movement applied to the structure(s) of interest to make it resemble the reference model.

The invention claimed is:

1. A method for analyzing and evaluating of at least one anatomical structure in a medical image, said medical image representing at least a part of a patient or person, said method comprising the steps of:
   a. mapping and registering the medical image to a reference image thereby segmenting the medical image, wherein the reference image is a segmented medical image based on and averaged over a plurality of medical images obtained from normal persons,
   b. analysing the segmented medical image for calculating the volume and/or providing the shape of the said anatomical structure(s), and
   c. providing a confidence interval of the volume and/or the shape of the analysed anatomical structure(s) based on individual data of the patient or person by analysing a database comprising information of normal volume and/or shape of said anatomical structure(s) corresponding to said individual data thereby quantifying the normality of said anatomical structure(s).

2. The method according to claim 1 wherein said individual data comprises information about at least one of: gender, age, height, weight, genotype, ethnicity, habits, handedness, cognitive measures and/or nationality of the patient or person.

3. The method according to claim 1, wherein the medical image is normalized prior to analysis of said medical image.

4. The method according to claim 1, wherein the confidence interval of the volume and/or the shape is provided as:
   at least one numerical value,
   and/or
   a graphical representation in the analysed medical image and/or in the reference image.

5. The method according to claim 1, wherein the medical image comprises at least a part of the brain of the patient or person.

6. The method according to claim 1, wherein the medical mage is a magnetic resonance image, a CT image, or an ultrasound image.

7. The method according to claim 1, wherein the analysed anatomical structure(s) is any segmentable brain structure selected from the group of hippocampus, amygdala, putamen, pons, thalamus, global pallidus, brainstem or cerebellum.

8. The method according to claim 1 for diagnosing a disease, and/or diagnosing the initial stage of a disease, said diagnosis based on the normality and/or the confidence interval of the analysed volume and/or shape of the at least one anatomical structure.

9. The method according to claim 8, wherein the disease is selected from the group of depression, Alzheimer, epilepsy, post-traumatic stress disorder, schizophrenia, anxiety, or Parkinson's disease.

10. A computer program product having a non-transitory computer readable medium, said computer program product providing a system for analysis and evaluation of at least one anatomical structure in a medical image, said medical image representing at least a part of a patient or person, said computer program product comprising means for carrying out all the steps of the method according to claim 1.

* * * * *